Aug. 24, 1937.  T. TOGNOLA  2,091,190
MAGNETO GENERATOR
Filed Nov. 16, 1935  3 Sheets-Sheet 2
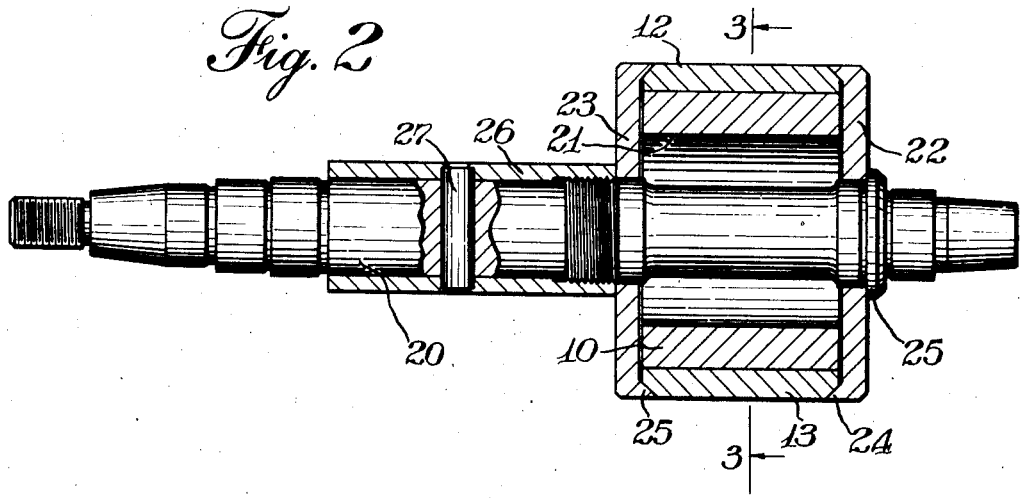
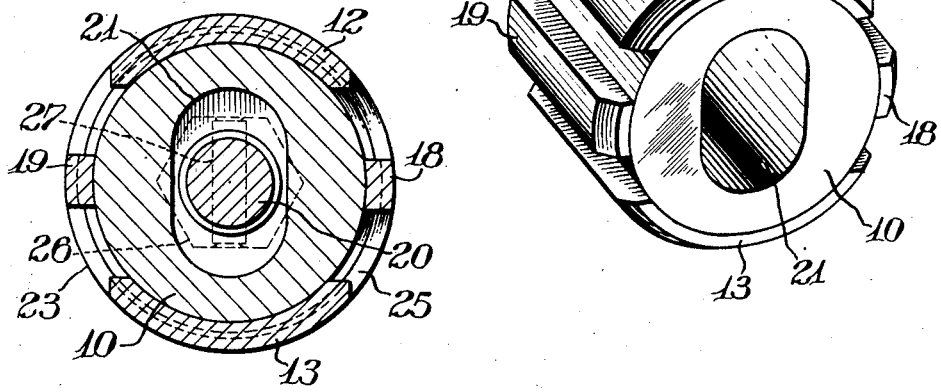
INVENTOR
Tullio Tognola
BY
Clinton S. Janes
ATTORNEY
Witness:
Burr W. Jones Aug. 24, 1937.   T. TOGNOLA   2,091,190
MAGNETO GENERATOR
Filed Nov. 16, 1935   3 Sheets—Sheet 3
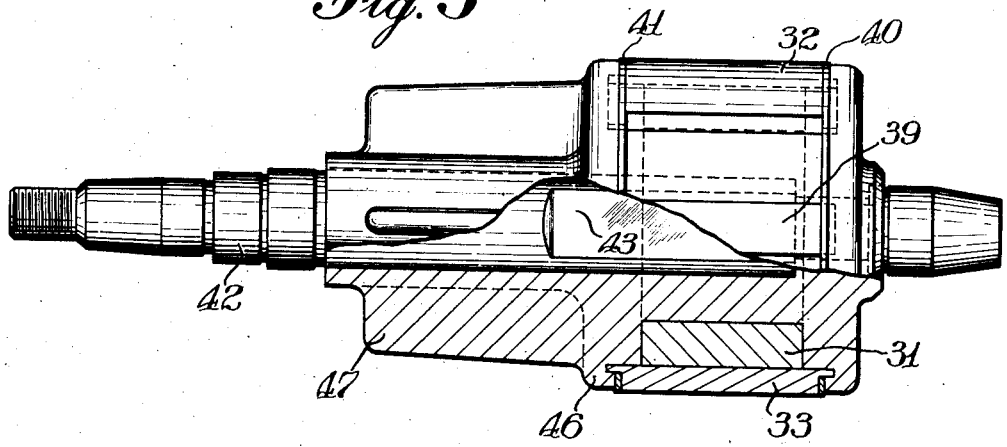
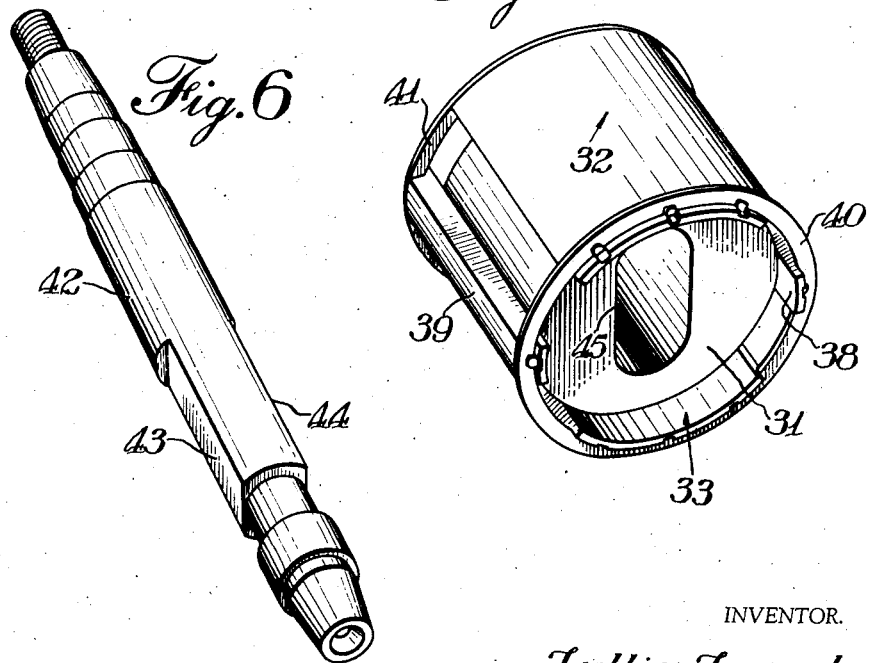
INVENTOR.
BY Tullio Tognola
ATTORNEY.
Witness:
Burr W. Jones Patented Aug. 24, 1937

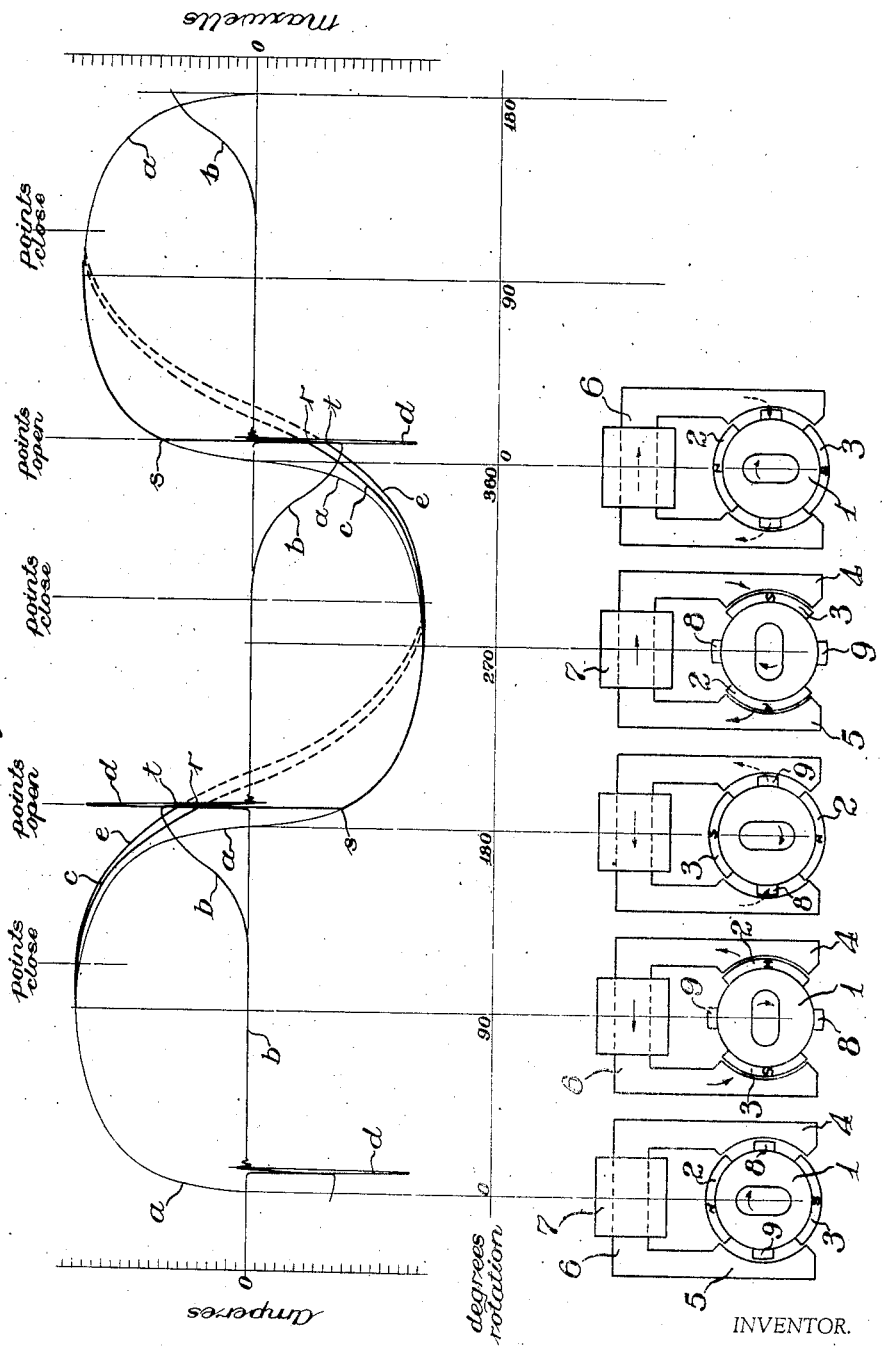

2,091,190

UNITED STATES PATENT OFFICE 2,091,190

MAGNETO GENERATOR

Tullio Tognola, Sidney, N. Y., assignor to Bendix Aviation Corporation, South Bend, Ind., a corporation of Delaware Application November 16, 1935, Serial No. 50,186

10 Claims. (Cl. 171—209)

The present invention relates to a magneto generator and more particularly to a high tension generator of the type used for ignition of interal combustion engines.

In high tension magneto generators of ordinary construction, flux from a permanent magnet is caused to reciprocate through the core of an induction coil, generating an alternating current in the primary thereof. The current flowing in the primary winding tends to build up a flux in the core in opposition to the change of impressed flux causing said current. At the time of maximum current flow, the primary circuit is opened by breaker points therein, and the consequent collapse of the field due to the primary current induces a high tension current in the secondary of the coil which is used for ignition.

It is obvious that any increase in the flux through the core induced by the primary current will, when the breaker points open, cause an increase in secondary voltage; and since the magnetic circuit of the core is completed through the permanent magnet, the flux of which is opposite to said induced flux, it has been heretofore proposed to increase the resultant flux, that is the algebraic sum of the impressed flux and the induced flux, by the provision of a magnetic shunt path for said flux of comparatively low reluctance. The advantage thus secured is largely nullified, however, by the fact that the shunt path is also in shunt with the permanent magnet and therefore short-circuits part of the flux thereof, thus reducing its efficiency; while to the extent that the shunt path is thereby saturated, it is rendered ineffective for its primary purpose.

It is an object of the present invention to provide a novel magneto generator which is reliable and efficient in operation, and simple and economical in construction.

It is another object to provide such a device which is arranged to increase and conserve the resultant flux through the core of its coil.

It is a further object to provide such a device in which the efficiency of the permanent magnet is not impaired by such flux-increasing means.

Further objects and advantages will be apparent from the following description taken in connection with the accompanying drawings in which:

Fig. 1 is a flux and current diagram with schematic showings of the magnetic circuits, illustrating the operation of a magneto embodying the present invention;

Fig. 2 is a side elevation partly in section of a magneto rotor embodying one preferred form of the invention;

Fig. 3 is a section taken substantially on the line 3—3 of Fig. 2;

Fig. 4 is a detail in perspective of the magnet structure of the rotor illustrated in Fig. 2;

Fig. 5 is a side elevation partly broken away of a rotor embodying another preferred form of the invention;

Fig. 6 is a perspective detail of the shaft of the rotor shown in Fig. 5; and

Fig. 7 is a detail in perspective of the magnet structure of said rotor.

In order to understand the theory of the present invention, reference is first made to Fig. 1 in which the magnetic circuit of a magneto is conventionally illustrated in various angular positions of the rotor, and a graph of the corresponding magnetic and electrical effects is co-related therewith. Referring first to the diagram illustrating the zero angular position, numeral 1 indicates the rotor magnet with pole shoes 2 and 3 adapted to cooperate with stator poles 4 and 5 which are in magnetic circuit with the core 6 of coil 7. In this position the pole shoes 2 and 3 are equi-distant between the stator poles 4 and 5 and no flux is impressed on the magnetic circuit of the core 6 by the magnet 1. In the next diagram the magnet 1 has rotated through 90 degrees so that the pole shoes 2 and 3 are in closest cooperation with the stator poles 4 and 5 whereby the maximum flux of magnet 1 is impressed on the magnetic circuit including core 6 in the direction indicated by the solid arrows. In the next diagram the magnet has rotated through 180 degrees, and the impressed flux is again zero. In the following diagram the magnet has rotated through 270 degrees from its initial position and the impressed flux is at a maximum in the opposite direction as again indicated by the solid arrows, and in the last diagram the magnet has rotated to its initial position and the impressed flux is again zero.

Referring to the graph, it will be seen that the line —a— shows the changes in impressed flux through the core 6 caused by the rotation of the rotor magnet 1, the maxima occurring at 90 and 270 degrees, and the maximum rates of change in flux occurring at zero, 180 and 360 degrees.

The line —b— of the graph illustrates the current generated in the primary of the coil 7 due to the impressed flux through its core. As here shown, from about 10 degrees to about 110 degrees of rotation of the rotor, the primary circuit is broken since the breaker points are open and no current flows therethrough. When the points close, a current is generated in the primary by reason of the change in impressed flux through its core due to the rotation of the rotor magnet. This current rises quite rapidly as shown and reaches a maximum slightly beyond the 180 degree position at which point the change in impressed flux is greatest. At this point of maximum current flow, the breaker points open, causing the current to drop to zero, whereupon the operation is repeated with the direction of current flow reversed due to the reversal of the change in impressed flux.

As above set forth, the current in the primary of the coil induces a flux in the core of the coil, causing a resultant flux therethrough which is the algebraic sum of the impressed flux and induced flux. This resultant flux is indicated by the line —c—. Since the induced flux is, within working limits, substantially proportional to the primary current, it reaches its maximum at the time the breaker points open. The consequent collapse of the resultant field from the point —r— on curve —c— to the point —s— on curve —a— induces the high tension current in the secondary of the coil, the voltage of which is indicated by the line —d—.

According to the present invention, means are provided for increasing the induced flux through the core 6 of the coil by providing a substantially closed magnetic path therefor during the periods when the impressed flux is reversing its direction, or in other words when the pole shoes 2 and 3 of the rotor are passing from one pole of the stator to the other. As herein illustrated, this is accomplished by the use of a pair of supplemental shoes 8 and 9 on the rotor spaced midway between the main pole shoes 2 and 3, the supplemental shoes being located substantially at the neutral points of the magnet 1 and having sufficient cross-sectional area to provide a path of comparatively low reluctance for the induced flux through the core 6 indicated by the dotted arrows.

As above indicated, the provision of the supplemental shoes 8 and 9 reduces the reluctance of the magnetic circuit of core 6 during the periods of reversal of impressed flux, but as clearly seen from the position of the parts at 90 degrees and 270 degrees rotation, these shoes do not substantially affect the action of the rotor at the times of maximum impressed flux.

The resultant flux when the auxiliary shoes 8 and 9 are used has been plotted as the curve —e—, and it will be seen that this curve indicates that at the time the breaker points open, the value of the resultant flux —t— represents a substantial gain —t, r— due to the use of the auxiliary shoes. A corresponding increase in secondary output voltage is obtained by this means, which has been found in practice to substantially increase the capacity and efficiency of the magneto.

In Figs. 2, 3, and 4 one method of incorporating the auxiliary magnetic shoes in the rotor is illustrated. As here shown, a ring type magnet 10 is provided with pole shoes 12 and 13 and auxiliary shoes 18 and 19 shaped to fit the periphery of the magnet 10 and bevelled off at their ends.

A rotor shaft 20 is arranged to traverse the opening 21 in the magnet 10 and has mounted thereon a pair of flange members 22 and 23 having bevelled lips 24 and 25 arranged to cooperate with the bevelled surfaces at the ends of the rotor shoes. Suitable means for clamping the flange members 22 and 23 on the rotor is provided in the form of an abutment flange 25 on shaft 20 for the flange member 22 and a sleeve 26 threaded on the shaft in position to engage the flange member 23, and suitably retained in position as by means of a pin 27.

In Figs. 5, 6, and 7 another form of rotor embodying the present invention is illustrated comprising a ring magnet 31 having pole shoes 32 and 33 and auxiliary shoes 38 and 39 located thereon as by means of non-magnetic rings 40 and 41. A rotor shaft 42 is provided having flats 43 and 44 formed thereon adapted to be received in the opening 45 of the magnet 31. The rotor is completed and unified by means of non-magnetic material 46 which is cast or molded about the shaft 42 and within and around the magnet 31 whereby the shoes 32, 33, 38 and 39 are imbedded therein. Suitable impeller blades 47 may, as illustrated, be formed from the material 46 in order to facilitate cooling of the magneto.

In the operation of the device, the rotation of the magnetic rotor causes the flux thereof to reciprocate through the core 6 of coil 7 generating a reciprocating current in the primary thereof. The auxiliary shoes 8, 9, etc. are effective during the times of maximum current flow through the primary to reduce the reluctance of the magnetic circuit of the core 6 and thereby increase and conserve the flux therethrough induced by said current. When the breaker points open, the consequent collapse of the resultant field induces a secondary output voltage which is correspondingly greater than that of a conventional magneto as above set forth.

Although certain embodiments of the invention have been shown and described in detail, it will be understood that other embodiments are possible and that changes may be made in the design and details of construction of the parts without departing from the spirit of the invention as defined in the claims appended hereto.

What is claimed is:

1. In a high tension magneto generator a rotor including a permanent magnet, a stator including a coil and a core therefor arranged to be traversed by the flux from the rotor, and flux conductors providing a path which completes a magnetic circuit of low reluctance for said core at such times as the flux impressed through the core by the magnet is of low value, said path being open when the impressed flux is at the maximum.

2. In a high tension magneto generator a rotor including a permanent magnet, a stator including a coil and a core therefor arranged to be intermittently traversed by the flux from the rotor, and magnetic conductors on said rotor spaced from the poles of said magnet and arranged to intermittently substantially close the magnetic circuit of said core through the neutral portion of said magnet.

3. In a magneto generator a rotor including a permanent magnet and peripheral pole shoes therefor, and intermediate peripheral elements of highly permeable material spaced from said pole shoes and diametrically arranged adjacent the neutral portions of said magnet to provide a path of low reluctance transversely through said magnet.

4. A rotor for a magneto generator including a permanent magnet in the form of a cylinder with diametrically arranged poles, arcuate pole shoes capping said poles, intermediate arcuate shoes equi-distantly spaced from the pole shoes, retaining discs and means to clamp the discs against the magnet and anchor the shoes thereon.

5. A rotor for a magneto including a shaft, a cylindrical magnet having diametrical poles and an opening to receive said shaft, arcuate pole shoes mounted on said magnet, intermediate arcuate shoes of magnetic material mounted adjacent the neutral portions of the magnet, means for retaining the shoes on the magnet, and a body of non-magnetic material enveloping and unifying the shaft, magnet, shoes and retaining means.

6. In a high tension magneto generator a rotor including a permanent magnet, a stator including a coil, a core therefor of magnetic material and means for causing flux from the rotor to reciprocate through the core and thereby generate an electrical current in said coil, and means effective during the times of reversal of flux from the rotor for completing a substantially closed magnetic path for flux through said core due to the flow of current through said coil, said means being ineffective to transmit the flux of the rotor.

7. In a high tension magneto generator a rotor including a permanent magnet, a stator including a coil, a core therefor of magnetic material and means for causing flux from the rotor to reciprocate through the core and thereby generate an electrical current in said coil, and means on said rotor effective during the times of maximum current flow through said coil for substantially closing the magnetic circuit of said coil, said means being out of the path of impressed flux from the rotor.

8. In a magneto generator a rotor including a permanent magnet, a stator including an induction coil, means providing a path of low reluctance for impressed flux from said magnet through said coil, and means out of the path of impressed flux cooperating therewith for completing a magnetic circuit through the coil when the rotor magnet is in neutral position with respect to said path.

9. In a magneto generator a rotor including a permanent magnet, a stator including an induction coil, means whereby rotation of the magnet causes impressed flux from the magnet to oscillate through the coil and generate alternating currents therein, and means out of the path of said impressed flux for facilitating the passage of magnetic flux through the coil caused by the currents so generated.

10. In a magneto generator a rotor including a permanent magnet, a stator including an induction coil, means whereby rotation of the magnet causes impressed flux from the magnet to oscillate through the coil and generate alternating currents therein, and means on the rotor out of the path of said impressed flux for periodically completing a magnetic circuit through the coil to carry the flux caused by said currents.

TULLIO TOGNOLA.